United States Patent
Zha et al.

(10) Patent No.: US 11,851,606 B2
(45) Date of Patent: Dec. 26, 2023

(54) LOST CIRCULATION TEST METHOD FOR EXPANDABLE GEOPOLYMERS

(71) Applicant: CNPC USA CORPORATION, Houston, TX (US)

(72) Inventors: Weibin Zha, Spring, TX (US); Meng Lu, Sugar Land, TX (US); Janine Shipman, Houston, TX (US)

(73) Assignees: CNPS USA CORPORATION, Houston, TX (US); BEIJING HUAMEI INC., Beijing (CN); CHINA NATIONAL PETROLEUM CORPORATION, Beijing (CN)

( * ) Notice: Subject to any disclaimer, the term of this patent is extended or adjusted under 35 U.S.C. 154(b) by 7 days.

(21) Appl. No.: 17/452,734

(22) Filed: Oct. 28, 2021

(65) Prior Publication Data

US 2023/0136505 A1    May 4, 2023

(51) Int. Cl.
| | |
|---|---|
| *C09K 8/00* | (2006.01) |
| *C09K 8/24* | (2006.01) |
| *C09K 8/487* | (2006.01) |
| *G01N 15/08* | (2006.01) |
| *C09K 8/504* | (2006.01) |
| *C04B 28/00* | (2006.01) |
| *C04B 28/02* | (2006.01) |

(52) U.S. Cl.
CPC .......... *C09K 8/5045* (2013.01); *C04B 28/006* (2013.01); *C04B 28/021* (2013.01); *G01N 15/082* (2013.01); *G01N 15/0806* (2013.01)

(58) Field of Classification Search
CPC ...... C09K 8/00–24; C09K 8/42; C09K 8/487; C09K 8/50; C09K 8/5045; C09K 8/588–592; C09K 17/00; C09K 17/20; C04B 28/006; C04B 28/021; G01N 15/00; G01N 15/08; G01N 15/0806; G01N 15/082

See application file for complete search history.

(56) References Cited

U.S. PATENT DOCUMENTS

| | | |
|---|---|---|
| 2011/0130965 A1 | 6/2011 | Slater et al. |
| 2014/0182369 A1 | 7/2014 | Blue et al. |
| 2018/0266197 A1 | 9/2018 | Amanullah et al. |

(Continued)

FOREIGN PATENT DOCUMENTS

| | | | |
|---|---|---|---|
| CN | 204422525 U | 6/2015 | |
| CN | 113511843 A | * 10/2021 | ............. E21B 33/13 |

(Continued)

OTHER PUBLICATIONS

Soucy, Kelly et al. "AADE-19-NTCE-084 A fit for purpose expandable sealant for demanding conformance applications." American Association of Drilling Engineers, National Technical Conference (Apr. 9-10, 2019).

(Continued)

*Primary Examiner* — Nguyen Q. Ha
(74) *Attorney, Agent, or Firm* — Ramey LLP

(57) ABSTRACT

The disclosure includes a new test method of evaluating lost circulation prevention with expandable geopolymers. The expandable geopolymer is tested using a permeability plugging tester, slot disk, drilling fluid, and a piston to determine how much fluid is released from the test cell.

18 Claims, 4 Drawing Sheets

(56) References Cited

U.S. PATENT DOCUMENTS

2021/0253934 A1    8/2021    Pisklak

FOREIGN PATENT DOCUMENTS

WO      2014062626 A1    4/2014
WO      2021162712 A1    8/2021

OTHER PUBLICATIONS

Kamali, Mahommadreza et al. "Alternative setting materials for primary cementing and zonal isolation—Laboratory evaluation of rheological and mechanical properties," Journal of Petroleum Science and Engineering, vol. 201, Jun. 2021, 108455, ISSN 0920-4105, https://doi.org/10.1016/j.petrol.2021.108455, (https://www.sciencedirect.com/science/article/pii/S0920410521001145).

Mansour, A., et al. "Smart lost circulation materials for productive zones." Journal Petroleum Exploration and roduction Technology 9, 281-296 (2019); published May 2, 2018. https://doi.org/10.1007/s13202-018-0458-z.

Slotted Disk, 1 Slot, 1" Thick, 2.12" Diameter, 1000 Micron. OFI Testing Equipment, Inc. (Oct. 18, 2021). Retrieved Sep. 26, 2022, from https://www.ofite.com/products/drilling-fluids/filtration/category/94-slotted-filter-disks.

Slotted Filter Disks, OFI Testing Equipment, Inc. Newsroom (May 26, 2020). Retrieved Sep. 26, 2022, from https://www.ofite.com/news/slotted-filter-disks.

International Search Report and Written Opinion dated Nov. 25, 2022 for related International Application No. PCT/US2022/074757.

* cited by examiner

LOST CIRCULATION TEST METHOD FOR EXPANDABLE GEOPOLYMERS

FIELD

The disclosure relates generally to oil drilling. The disclosure relates specifically to a testing method for decreasing drilling fluid loss.

BACKGROUND

When drilling fluid is being lost into a formation, lost circulation material (LCM) can be added to the drilling fluid to decrease the loss. LCM is generally flaky, fibrous, or ground material that is added to the drilling fluid to seal where the drilling fluid loss is occurring. LCM is often cedar bark, shredded cane stalks, mineral fiber, hair, mica flakes, pieces of plastic, ground limestone, ground marble, wood, nut hulls, Formica®, corn cobs, or cotton hulls.

The traditional test method of a lost circulation material monitors the effectiveness of the LCM in plugging an opening. However, when the LCM is an expandable geopolymer, there are no particles in the geopolymer to plug the aperture.

It would be advantageous to have a method that can test the capability of an expandable geopolymer in preventing fluid loss.

SUMMARY

An embodiment of the disclosure is a method of testing an expandable geopolymer lost circulation material comprising obtaining a permeability plugging tester, wherein the permeability plugging tester comprises a test cell; loading drilling fluid to a lower part of the test cell, wherein the drilling fluid is on top of a piston located in the test cell; loading a geopolymer on top of the drilling fluid; increasing the temperature within the test cell, wherein the geopolymer expands and solidifies; applying pressure from the piston; and testing the lost circulation prevention capability of the expandable geopolymer, comprising collecting and measuring how much drilling fluid comes out of the test cell. In an embodiment, the drilling fluid is oil-based. In an embodiment, the method further comprises placing glass paper on top of the drilling fluid. In an embodiment, the pressure is from 2000-5000 psi. In an embodiment, the pressure is at 4000 psi. In an embodiment, the geopolymer has a 10% expansion rate. In an embodiment, the geopolymer has a 20% expansion rate. In an embodiment, the geopolymer comprises silicate. In an embodiment, the geopolymer comprises fly ash. In an embodiment, the slot disk has one slot. In an embodiment, the slot is from about 200 micron to 5000 microns in width. In an embodiment, the slot is from about 1000 microns to 5000 microns in width. In an embodiment, the slot disk has three slots. In an embodiment, the slot disk is 1 inch thick. In an embodiment, the slot disk comprises an O-ring. In an embodiment, the slot disk is ¼ inch thick. In an embodiment, the temperature inside the test cell is about 80-90° C. for at least about 2 hours. In an embodiment, the temperature is increased to about 180° C. and maintained for about 24 hours. In an embodiment, as the temperature is increased, the geopolymer starts expanding and plugging the slot while simultaneously solidifying. In an embodiment, a syringe is used to load the geopolymer on top of the drilling fluid.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 11th Edition.

Disclosed herein is a new test method to evaluate the application of expandable geopolymers as lost circulation material through using a permeability plugging tester (PPT).

Figure 1:
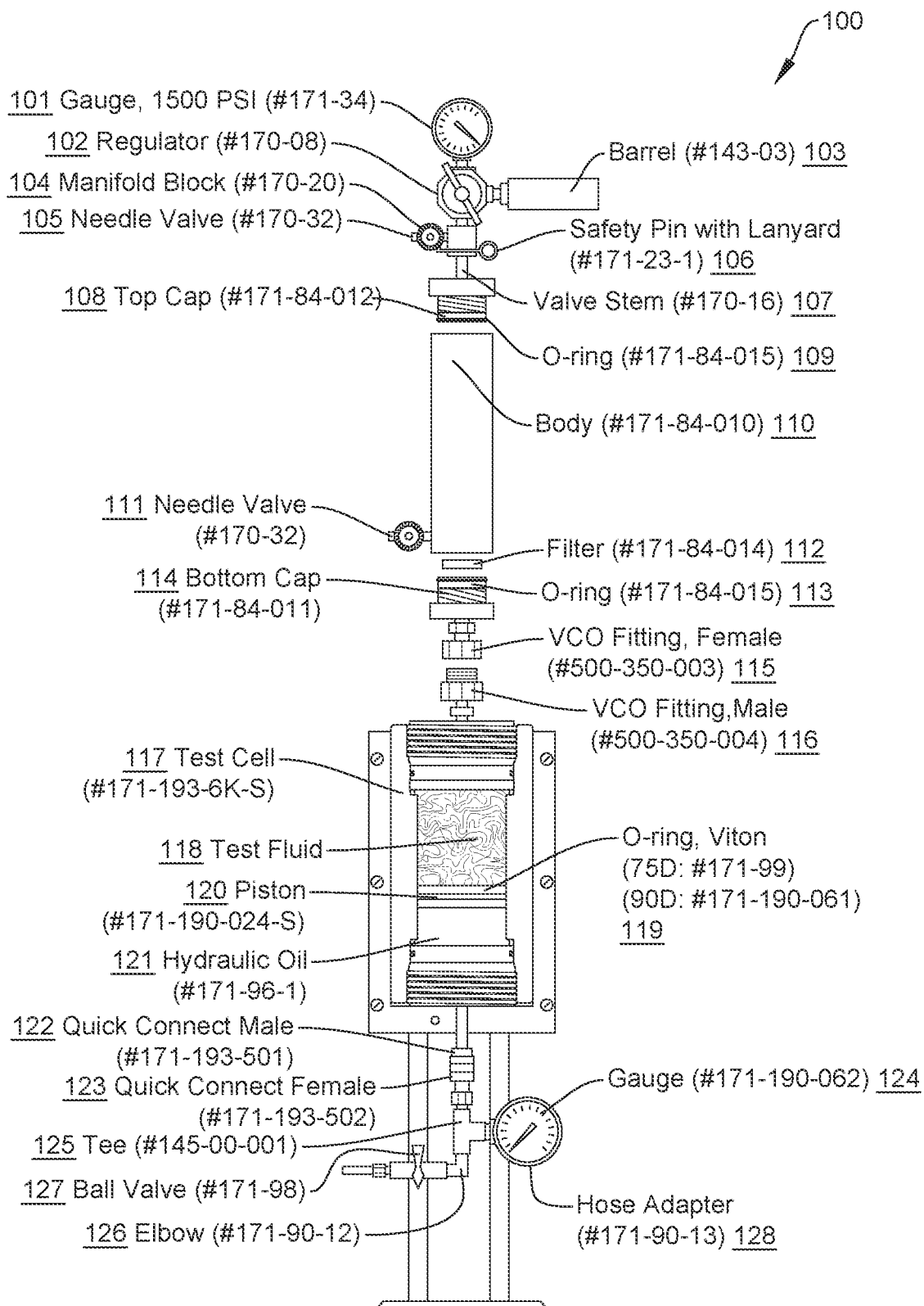
FIG. 1 depicts a permeability plugging tester.

The method can test the capability of one or more geopolymers in preventing fluid loss in a lost circulation test. The method can be used in the laboratory to evaluate the lost circulation prevention capability of expandable geopolymers. The method utilizes a traditional permeation plugging tester (PPT) (FIG. 1) with a new procedure to evaluate a new lost circulation material.

In an embodiment, the geopolymer is an inorganic polymer that forms long-range, covalently bonded, non-crystalline networks. In an embodiment, a geopolymer is produced by mixing a liquid hardener with a reactive aluminosilicate species. In an embodiment, the liquid phase is an alkali silicate solution. In an embodiment, the geopolymer is composed of alkali-activated aluminosilicate (AAAS) and Class F Fly ash (ASTM C618-18, 2015). In an embodiment, the geopolymeric precursor can be fly ash, metakaolin, or naturally occurring rocks. In an embodiment, the geopolymer can be a silicon dioxide geopolymer. In an embodiment, the geopolymer can be a sodium silicate. In an embodiment, any suitable expanding geopolymer can be tested using this method. In an embodiment, the blowing agent is metal particles (150-600 micron) of a proprietary Al/Mg alloy. In an embodiment, the expansion rate is controlled by the amount of metal particles added.

Figure 3:
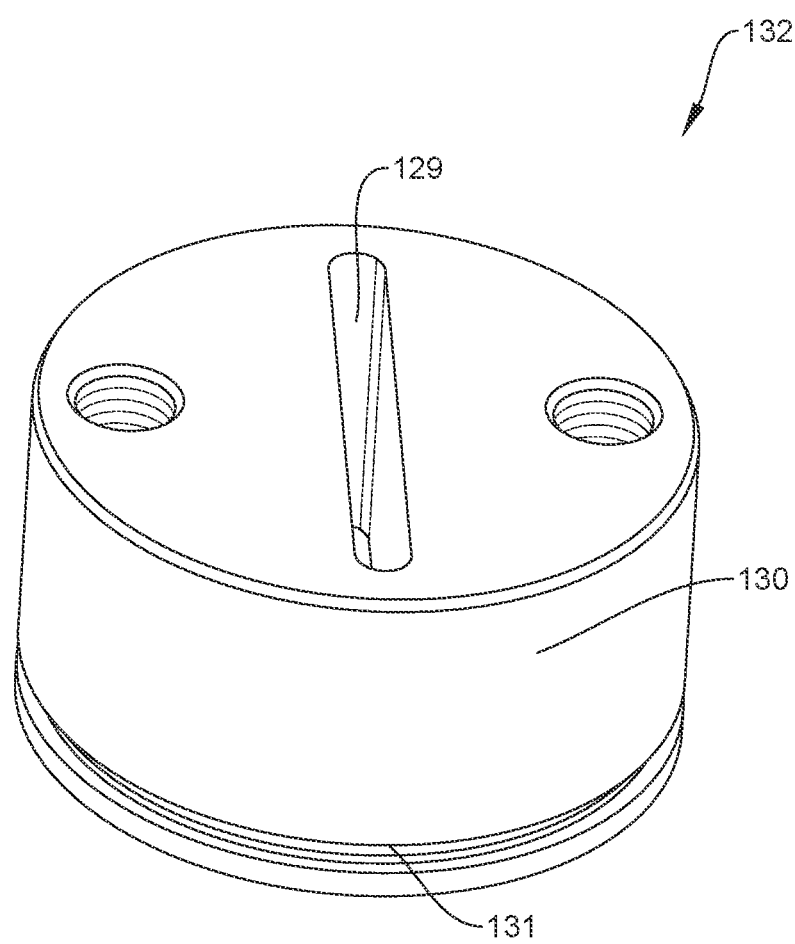
FIG. 3 depicts a slotted stainless disk with 5 mm/6 mm slot width.

In an embodiment, a permeability plugging tester (PPT) 100 (FIG. 1) is used to test lost circulation with a slot disk 132 (FIG. 3). In an embodiment, the slot is 5 mm. In an embodiment, the slot is 6 mm. In an embodiment, the slot disk 132 is comprised of stainless steel. In an embodiment, there is one slot 129. In an embodiment, there are three slots. In an embodiment, the slots are straight. In an embodiment, the slots are tapered. In an embodiment, the slot disks 132 are ¼ inch thick. In an embodiment, the slot disks are 1 inch thick. In an embodiment, the disks have 3 slots, the size of the slots ranges from 100 microns to 5000 microns wide. For disks with a single slot, the size ranges from 100 microns to 5000 microns wide. In an embodiment, the slots in the slot disks range from 100 microns to 4500 microns. In an embodiment, the slots in the slot disks range from 100 microns to 4000 microns. In an embodiment, the slots in the slot disks range from 100 microns to 3500 microns. In an embodiment, the slots in the slot disks range from 100 microns to 3000 microns. In an embodiment, the slots in the slot disks range from 100 microns to 2500 microns. In an embodiment, the slots in the slot disks range from 100 microns to 2000 microns. In an embodiment, the slots in the slot disks range from 100 microns to 1500 microns. In an embodiment, the slots in the slot disks range from 100 microns to 1000 microns. In an embodiment, the slots in the slot disks range from 100 microns to 500 microns. In an embodiment, the slots in the slot disks range from 200 microns to 5000 microns. In an embodiment, the slots in the slot disks range from 400 microns to 5000 microns. In an embodiment, the slots in the slot disks range from 600 microns to 5000 microns. In an embodiment, the slots in the slot disks range from 800 microns to 5000 microns. In an embodiment, the slots in the slot disks range from 1000 microns to 5000 microns. In an embodiment, the slots in the slot disks range from 1500 microns to 5000 microns. In an embodiment, the slots in the slot disks range from 2000 microns to 5000 microns. In an embodiment, the slots in the slot disks range from 2500 microns to 5000 microns. In an embodiment, the slots in the slot disks range from 3000 microns to 5000 microns. In an embodiment, the slots in the slot disks range from 3500 microns to 5000 microns. In an embodiment, the slots in the slot disks range from 4000 microns to 5000 microns. In an embodiment, the slots in the slot disks range from 4500 microns to 5000 microns. In an embodiment, the slots in the slot disks range from 200 microns to 4500 microns. In an embodiment, the slots in the slot disks range from 400 microns to 4000 microns. In an embodiment, the slots in the slot disks range from 600 microns to 3500 microns. In an embodiment, the slots in the slot disks range from 800 microns to 3000 microns. In an embodiment, the slots in the slot disks range from 1000 microns to 2500 microns. In an embodiment, the slots in the slot disks range from 1500 microns to 2000 microns.

In an embodiment, the ¼ inch slot disks fit into the test cell of the PPT where a ceramic disk would fit. In an embodiment, the 1 inch thick disks fit inside the inner diameter of the test cell where the test fluid is located. In an embodiment, the 1 inch thick disks include an O-ring 131 around the outside edge to prevent fluid from flowing around it. In an embodiment, the 1 inch disks only include a single slot. In an embodiment, the straight slots are from 1000 to 5000 microns. In an embodiment, the tapered slots are from 1 mm-2 mm to 5 mm-6 mm.

Figure 2:
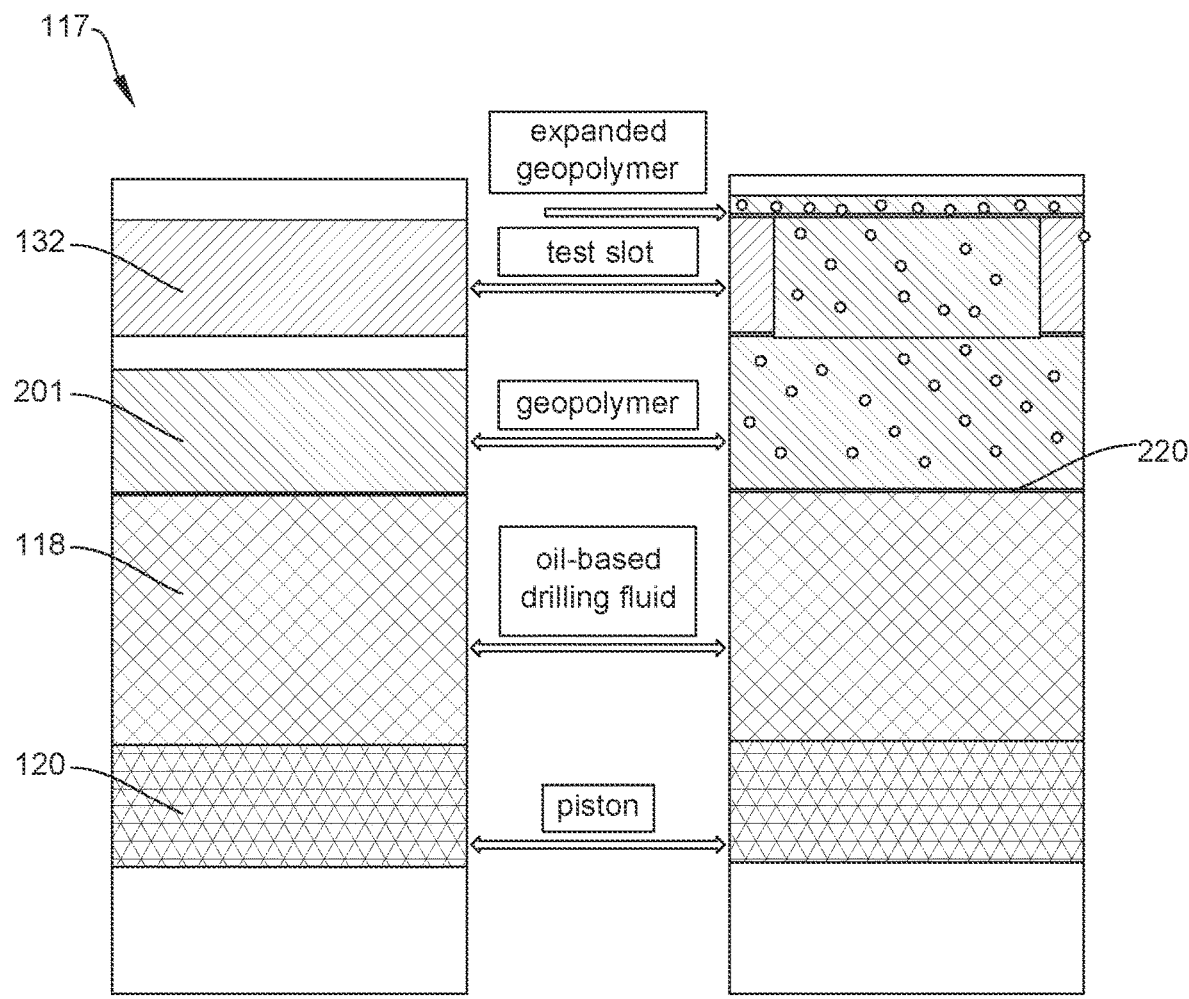
FIG. 2 depicts the test set up.
Figure 4A:
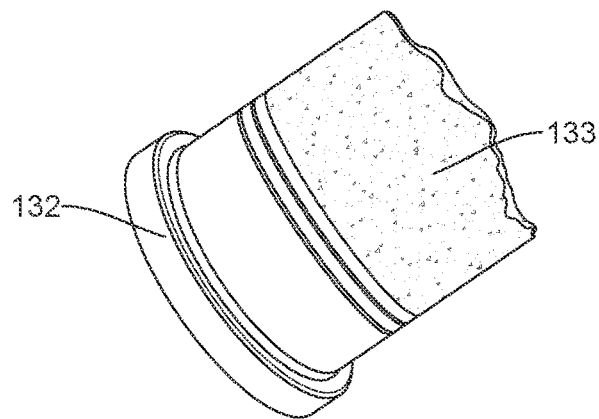
FIG. 4A depicts the geopolymer and slotted disk after testing.
Figure 4B:
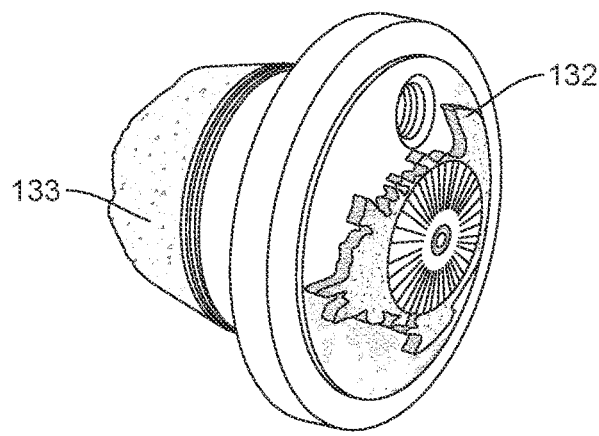
FIG. 4B depicts the geopolymer and slotted disk after testing.
Figure 4C:
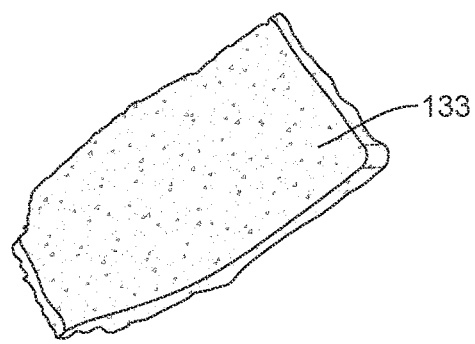
FIG. 4C depicts the geopolymer after testing.

FIG. 2 depicts a test cell 117 set up. In an embodiment, the slot disk 132 is placed in the test cell 117. In an embodiment, a drilling fluid 118 or 207 is loaded to the lower part of the test cell 117 on top of the piston 120. A calculated amount of expandable geopolymer 201 is then loaded on top of the drilling fluid 118. In an embodiment, a piece of glass paper 220 is placed on top of the drilling fluid. The glass paper 220 is present to prevent the geopolymer and drilling fluid from mixing. In an embodiment, the glass paper 220 is paper coated with powdered glass. As the temperature in the test cell is increased, the expandable geopolymer 201 starts expanding and plugging the slot 129 while solidifying at the same time. After the expandable geopolymer 201 is fully cured/solidified, pressure can be applied from the piston 120 to test the lost circulation prevention capability of the expandable geopolymer 201. FIG. 3 depicts a slot disk 132 including a body 130 and the O ring 131, a slot 129 being formed in the body 130. FIGS. 4A and 4B depict the slot disk 132 and the geopolymer 133 after testing. FIG. 4C depicts the geopolymer 133 after testing.

Example 1

1. A pre-determined amount of oil-based drilling fluid (mud) was loaded into the test cell of a permeability plugging tester (Ofite®), leaving enough room (about one inch to touch the disk) for loading the geopolymer.

2. One layer of glass paper was placed on top of the mud.

3. A syringe was used to carefully add the geopolymer on top of the glass paper so that geopolymer does not mix with the mud. The volume of geopolymer depends on the pre-determined expansion rate. As the geopolymer expands, the slot and other vacant areas are filled by the expanded geopolymer.

4. The slotted disk was placed in the test cell, the test cell was closed, and the test cell was placed into a pre-heated sleeve. The temperature was controlled inside the test cell to be 80-90° C. for a minimum of 2 hours. After that, the temperature was increased to 180° C. for 24 hours. The temperature can be any other high predetermined temperature.

5. The test cell temperature was kept at the high predetermined temperature and the test cell was connected to a manual pressure pump to increase the pressure. Any liquid (drilling fluid) that came out of the test cell was collected.

6. The performance of the geopolymer was evaluated by the amount of liquid (drilling fluid/mud) collected.

Example 2

Results: The method was tested with an expandable geopolymer formulation. The geopolymer is composed of alkali-activated aluminosilicate (AAAS) and Class F Fly ash (ASTM C618-18, 2015). The blowing agent is metal particles (150-600 micron) of a proprietary Al/Mg alloy. The expansion rate is controlled by the amount of metal particles added. The expansion speed can be controlled by the size of the particles and by the test temperature. The higher the temperature, the faster the geopolymer expands. The pressure reached 5000 psi without significant loss of drilling fluid (less than 5 ml).

Example 3

Results: With a 10% expansion rate, less than 5 ml of drilling fluid was collected when the pressure was below 4000 psi; with a 20% expansion rate, less than 5 ml of drilling fluid was collected when the pressure was below 2000 psi.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit, and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A method of testing an expandable geopolymer lost circulation material comprising
    obtaining a permeability plugging tester, wherein the permeability plugging tester comprises a test cell;
    loading a drilling fluid to a lower part of the test cell, wherein the drilling fluid is on top of a piston located in the test cell;
    placing a glass paper on top of the drilling fluid;
    loading a geopolymer on top of the glass paper;
    increasing temperature within the test cell, wherein the geopolymer expands and solidifies;
    applying pressure from the piston; and
    testing lost circulation prevention capability of the expandable geopolymer, comprising collecting and measuring how much of the drilling fluid comes out of the test cell.

2. The method of claim 1 wherein the drilling fluid is oil-based.

3. The method of claim 1 wherein the pressure is from 2000-5000 psi.

4. The method of claim 3 wherein the pressure is at 4000 psi.

5. The method of claim 1 wherein the geopolymer has a 10% expansion rate.

6. The method of claim 1 wherein the geopolymer has a 20% expansion rate.

7. The method of claim 1 wherein the geopolymer comprises silicate.

8. The method of claim 1 wherein the geopolymer comprises fly ash.

9. The method of claim 1 wherein the slot disk has one slot.

10. The method of claim 9 wherein the slot is from about 200 micron to 5000 microns in width.

11. The method of claim 10 wherein the slot is from about 1000 microns to 5000 microns in width.

12. The method of claim 1 wherein the slot disk has three slots.

13. The method of claim 1 wherein the slot disk is 1 inch thick.

14. The method of claim 1 wherein the slot disk comprises an O-ring.

15. The method of claim 1 wherein the slot disk is ¼ inch thick.

16. The method of claim 1 wherein the temperature inside the test cell is about 80-90° C. for at least about 2 hours.

17. The method of claim 16 wherein the temperature is increased to about 180° C. and maintained for about 24 hours.

18. The method of claim 17 wherein as the temperature is increased, the geopolymer starts expanding and plugging the slot while solidifying.

* * * * *